June 24, 1930.  J. A. LEMIEUX  1,766,914
AEROPLANE
Filed Dec. 5, 1929    2 Sheets-Sheet 1
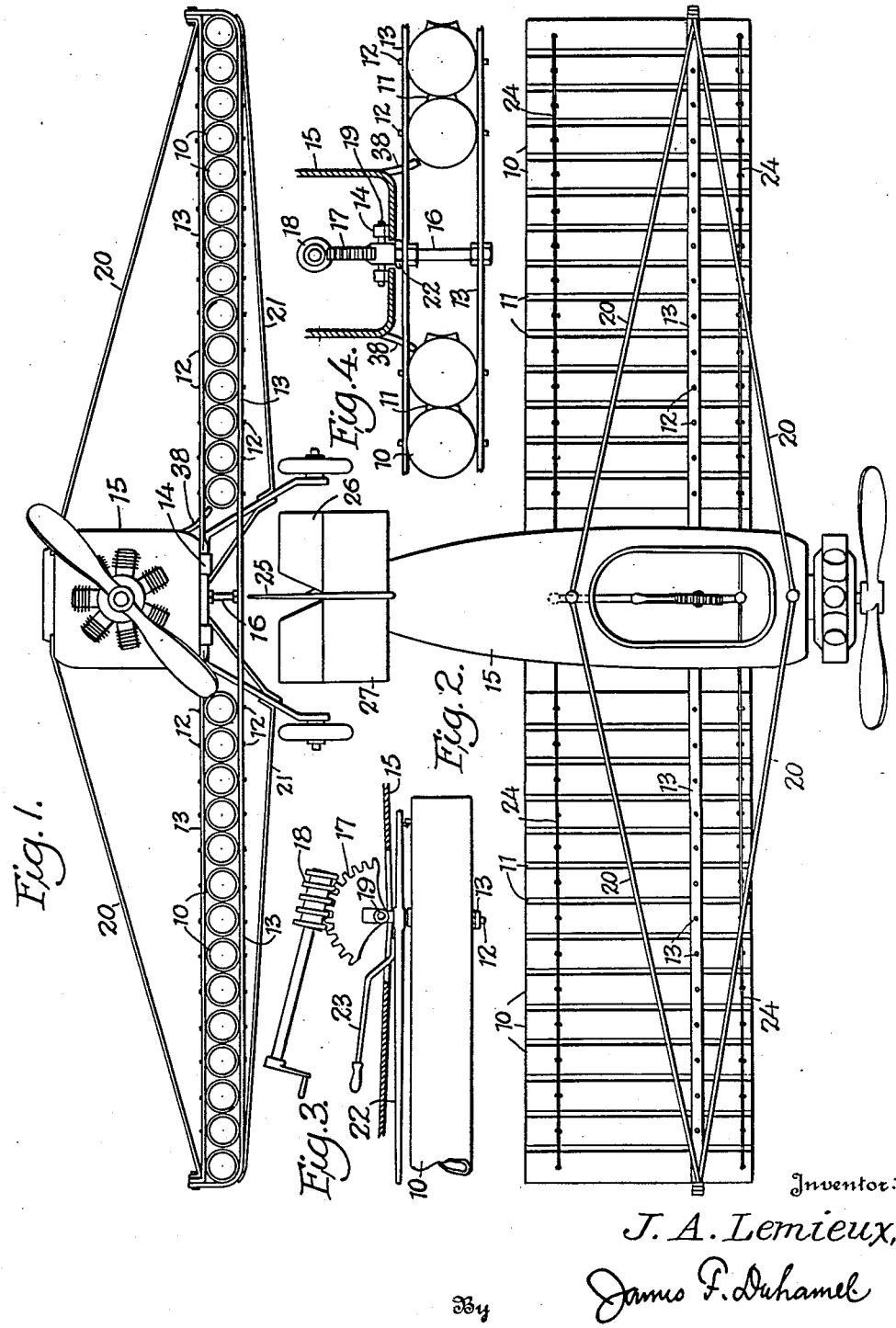
Inventor:
J. A. Lemieux,
By James F. Duhamel
Attorney June 24, 1930.　　　　J. A. LEMIEUX　　　　1,766,914
AEROPLANE
Filed Dec. 5, 1929　　　2 Sheets-Sheet 2
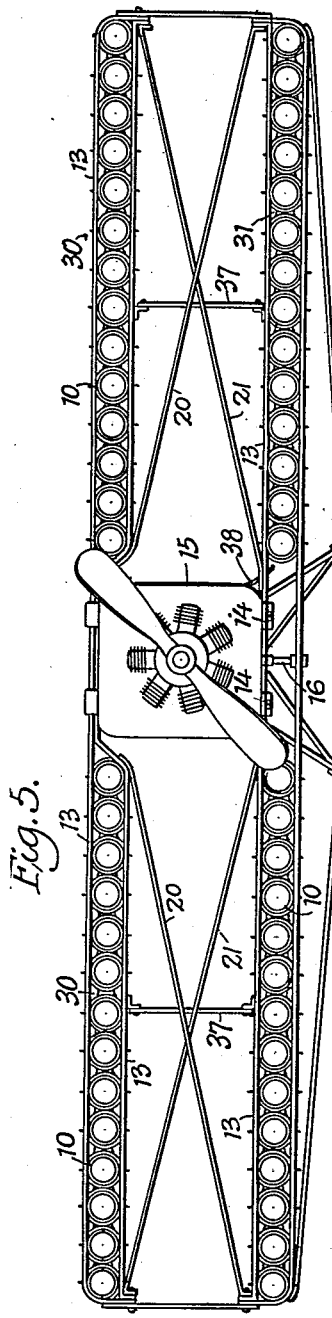

Patented June 24, 1930

1,766,914

UNITED STATES PATENT OFFICE

JOSEPH A. LEMIEUX, OF WASHINGTON, DISTRICT OF COLUMBIA

AEROPLANE

Application filed December 5, 1929. Serial No. 411,905.

This invention relates to aeroplanes having float or pontoon attachment to act as hydroplanes, and its object is to provide more plane or wing surface by the use of tubes which may be closed to float the fuselage or opened to allow the passage of air and avoid resistance while passing through the air.

A further object of the invention is to independently pivot each tube so that they may be swung from one side to the other to act as a rudder and to mount them on an arm or rod journalled on the fuselage so they may be swung up or down to act as ailerons or elevators, or remain stationary.

These and other objects and details of the invention are more fully described in the following specification, set forth in the appended claims and illustrated in the accompanying drawings, wherein:

Figure 1 is a front elevation of the improved aeroplane.

Fig. 2 is a plan view of the same.

Figs. 3 and 4 are enlarged detail views of vertical shifting mechanism.

Fig. 5 is a front view of a modified form of the aeroplane.

Fig. 6 is an enlarged detail plan view of part of the horizontal shifting mechanism.

Fig. 7 is a detail plan view of several tubes with one in section showing the closing means.

Fig. 8 is a sectional view of a tube at a right angle to the above and on the line 8—8 of Fig. 7.

The plane or planes are made up of a series of tube units 10 arranged side by side longitudinally, one part of the outer surface of each tube having a concave extension 11 as shown in Fig. 4 into which the adjacent tube fits and is adapted to slide and on the upper and lower side of each tube is a stud 12 serving as a pivotal connection with the arms 13 that form a frame that is journalled in the bearings 14 on the under side of the fuselage 15, or as shown in Figs. 3 and 4 the two arms 13 are united by a bolt 16 whose upper end is journalled within the fuselage and has a toothed segment 17 engaged by a worm 18 to be operated by the aviator in the cockpit to swing the frame and the tubes 10 on the trunnions 19 to vary the tubes from the horizontal and cause the plane to ascend or descend, according to their inclination.

The frame carrying the tubes is braced to the fuselage by means of the stays 20 and 21 that are sufficiently flexible to allow the frame to shift as this movement is slight.

Loosely journalled on the bolt 17 is a lever 22 having an operating handle 23 extending within the fuselage and within reach of the aviator who may thus swing the said lever from right to left. At each end of the lever 22 is a cord 24 attached to the end of the tubes to cause the tubes to swing on their studs 12 to an angle corresponding with that of the handle 23, the tubes sliding beside each other as above described and having sufficient play with regard to each other to prevent jambing.

This horizontal swing of the tubes while the areoplane is in motion causes them to act as a rudder to guide the plane, but as will be seen in Fig. 2 the device may also for emergencies be equipped with the rudder 25, elevators 26 and stabilizer 27 operated in the usual manner.

The cords 24 are duplicated and are secured to the tubes at each side of the arms 13 and pivots 12 so that there is a positive pull on the tubes in either direction and they are secured to the lever 22 at each side of its pivot 16.

The device may be adapted for use as a hydroplane by using closed tubes as shown in Fig. 4 but in this case considerable obstruction would be offered the flight and the advantages of the inner surface of the tubes neglected.

In order to provide means to float the plane on the water the construction shown in Figs. 5, 7 and 8 may be adopted and at the same time the tubes are left open during the flight.

The upper series of tubes 30 are normally as above described but the lower series 31 of the biplane in Fig. 5 may be tilted and shifted as already described and have at each end the valves 32 controlled by the arms 33 that are operated by cords 34 running within the tubes to an outlet adjacent the arm 13 where they connect with a common connection 35 running to the fuselage where it may be operated by the aviator to instantly close all of the valves, front and rear, instantly. Semicircular abutments 36 are provided with the necessary packing to make a substantially water-tight closure when the valves are closed and when a take-off is desired the tubes may be elevated at their forward ends after the propeller is started and when the ends leave the water, the valves are opened and the tubes again become supporting planes or units.

With tubes of sufficient number or size the horizontal deflection of the same may suffice to hold the entrance out of the water and use these tubes immediately for the upward flight.

In Fig. 5 the lower series of tubes alone is tilted from the horizontal and connecting rods 37 may be used to cause the upper and lower series of tubes to operate in unison and the shifting means shown in Fig. 6 may be connected with cords 24 to be applied to both sets of tubes to cause them to move in unison.

In this view the lower series 31 is provided with the bolt 16 and segment 17 while the upper series of tubes 30 may be simply journalled on the top of the fuselage.

The fuselage 15 may have side flaps 38 to close the gap between its sides and the adjacent tubes and the bolt 16 may have appropriate lock nuts to engage the arms 13.

It is obvious that the parts may be otherwise arranged and modified without departing from the essential features above described or from the scope of the appended claims.

What I claim as new is:

1. In an aeroplane, the combination of a fuselage, a series of tubes arranged in substantially the direction of the flight of said aeroplane, and beneath the fuselage, means for deflecting said tubes above or below the horizontal, and means for shifting them to the right or the left.

2. In an aeroplane the combination of a fuselage, a series of tubes movable on said fuselage and adapted to be moved universally with relation to the same, means operable from the fuselage for deflecting said tubes from the horizontal, and means for shifting the said tubes from right to left.

3. In an aeroplane, the combination of a fuselage, tube units in parallel and comprising planes, means for deflecting said planes from the horizontal, means for shifting the tubes at angles from said fuselage, and means for converting certain tubes into floats.

4. In an aeroplane, the combination of a fuselage, arms journalled on said fuselage, tubes pivoted in the the arms, means for turning the arms in their bearings, means for turning the tubes on their pivots, and means for converting certain tubes into floats.

5. In an aeroplane, the combination of a fuselage, arms journalled on the same, tubes pivoted between said arms, a toothed segment and worm adapted to turn the arms in their bearings, a lever and cords adapted to shift the tubes on their pivots, and means for closing certain tubes.

6. In an aeroplane, the combination of a fuselage, arms journalled under said fuselage, means for rotating the said arms, tubes pivoted in the arms, means for swinging the tubes on their pivots, valves for closing the ends of the tubes, and means for operating the valves.

In testimony whereof I hereunto affix my signature.

JOSEPH A. LEMIEUX.